July 25, 1944.   C. SAURER   2,354,428
SHOCK ABSORBER
Filed Dec. 28, 1940   4 Sheets-Sheet 2

INVENTOR
Curt Saurer
Ely & Frye
ATTORNEYS

July 25, 1944.  C. SAURER  2,354,428

SHOCK ABSORBER

Filed Dec. 28, 1940  4 Sheets-Sheet 3

INVENTOR
Curt Saurer

ATTORNEYS

July 25, 1944.  C. SAURER  2,354,428
SHOCK ABSORBER
Filed Dec. 28, 1940  4 Sheets-Sheet 4

INVENTOR
Curt Saurer
BY
ATTORNEYS

Patented July 25, 1944

2,354,428

UNITED STATES PATENT OFFICE 2,354,428

SHOCK ABSORBER

Curt Saurer, Akron, Ohio, assignor to The Firestone Tire & Rubber Company, Akron, Ohio, a corporation of Ohio Application December 28, 1940, Serial No. 372,049

3 Claims. (Cl. 188—130)

This invention relates to shock absorbers such as commonly are used on a motor vehicle between the frame and running gear thereof to cushion the bound and rebound of the said frame when the vehicle is traveling over an uneven roadway, and more especially the invention relates to shock absorbers of the so-called friction type.

The chief objects of the invention are to provide an improved shock absorber of the character mentioned; to provide a friction shock absorber that will function satisfactorily for the life of the vehicle; that will not require lubrication; that is tightly sealed against dirt and grit; that will supply uniform friction at all temperatures from −30° to +120°; that will supply uniform friction throughout all positions that it assumes during operation; and that is relatively cheap to manufacture. Other objects will be manifest as the description proceeds.

Referring first to Figures 1 to 5 of the drawings, there is shown a shock absorber that is operatively interposed between the frame of a vehicle, indicated at 20, and the running gear of the vehicle, indicated at 21, it being understood that said frame and running gear normally move relatively of each other due to uneven roadways, which relative movement is cushioned by the usual springs (not shown). In general, the improved shock absorber comprises relatively movable parts, and friction material interposed between said parts for the purpose of opposing relative movement therebetween. One of said relatively movable parts is attached to the frame 20 by means of a bracket 22 that is welded or otherwise fixedly secured to said frame, the shock absorber part being removably attached to said bracket by bolts or the like 23, 23. The other relatively movable structure of the shock absorber is connected to the running gear 21 through the agency of a lever arm 24, and a link 25 having universal pivotal connection with the free end of said lever arm. Said universal pivotal connection comprises a substantially spherical body of rubber 26 that encloses a terminal ball 27 formed on the upper end of link 25, said rubber body being tightly encased in a generally spherical shaped hollow shell or housing 28 formed integrally with the free end portion of the lever arm 24. The lower end portion of the link 25 extends through an aperture 29 in the running gear structure 21, and through cylindrical rubber cushion blocks 30, 30 disposed above and below said aperture and within the same. Corrugated washers 31, 31 are mounted upon the remote faces of the cushion blocks 30, the latter being under some compressive stress by being confined between a flange 32 on the link that abuts the upper washer 31 and a nut 33 set up against the lower washer 31. The arrangement is such that the link 25 may tilt angularly, relatively of the running gear element 21, which tilting movement is yieldingly opposed by the rubber blocks 30.

The shock absorber proper comprises an annular outer shell comprising a pair of annular, co-axial side plates 35, 35 that are dished or concavo-convex in transverse section with their concave sides in confronting relation to provide an annular cavity. Each side plate is formed with a radial peripheral flange 36, which flanges are in abutting relation and are permanently secured to each other, preferably by welding at their edges, as shown at 37, Figure 4. It is to the abutted flanges 36 that the bracket 22 is bolted. The inner circumferential margins of the respective side plates 35 are bent axially outwardly away from each other so as to provide circumferential flanges 38, 38. Disposed between the side plates 35 of the said outer shell is an inner structure comprising a pair of circular discs or plates 40, 40 that are disposed concentrically of said outer shell, and are of somewhat smaller outside diameter than the latter. The discs 40 are formed with concavo-convex peripheral portions that are concentric with the axis of the shock absorber and are disposed within the concavo-convex region of the outer discs 35 in uniformly spaced relation thereto, the concave faces of said discs being in confronting relation so as to define an annular recess or compartment 41. Mounted in the latter is an annular ring of rubber 42 that normally is maintained under compressive stress, and which normally urges the discs 40 apart from each other for a purpose presently to be explained. The discs 40 are axially dished, and are arranged with the concave faces of the dished portions in confronting relation, the dished portions extending axially outwardly through the central openings in the plate 35 defined by the flanges 38, the outermost faces of the respective dished portions being flush with the plane of the edges of the respective flanges 38.

Vulcanized to the outer lateral face of each disc 40 is an annular layer of resilient rubber composition 44, which layer extends from the perimeter of the disc to the central dished portion thereof, but not over the latter. The outer, exposed surface of each rubber layer 44 is provided with a facing of friction material 45 that is vulcanized thereto. The said friction material preferably consists of square-woven fabric or heavy duck, and it is impregnated with a suitable lubricating material. Such material may consist of colloidal graphite suspended in castor oil, but other lubricants of a similar nature may be employed. The castor oil has no detrimental effect upon the rubber, it is not affected by temperatures of from minus 30° to plus 120°, and will continue to lubricate the friction material during the life of the shock absorber. As is clearly shown in Figure 4, the friction facings 45 are in contact with the confronting faces of the respective outer plates 35 from the perimeter of the concavo-convex portions of the latter to the inner circumferential flanges 38 thereof. The arrangement is such that the expansive force of the normally compressed rubber ring 42, which urges the discs 40 away from each other, serves to hold the friction facings 45 in contact with the surfaces of the side plates 35 under determinate pressure at all times. The outer lateral face of each friction-faced layer 44 is formed with a shallow recess 46 that is concentric with the axis of the shock absorber and adapted to retain a supply of the graphite-oil lubricant for future use. The lubricated friction material will not squeak while sliding over metal, and it has no "break away" action such as obtains in other friction materials, such as brake lining.

Figures 1, 2:
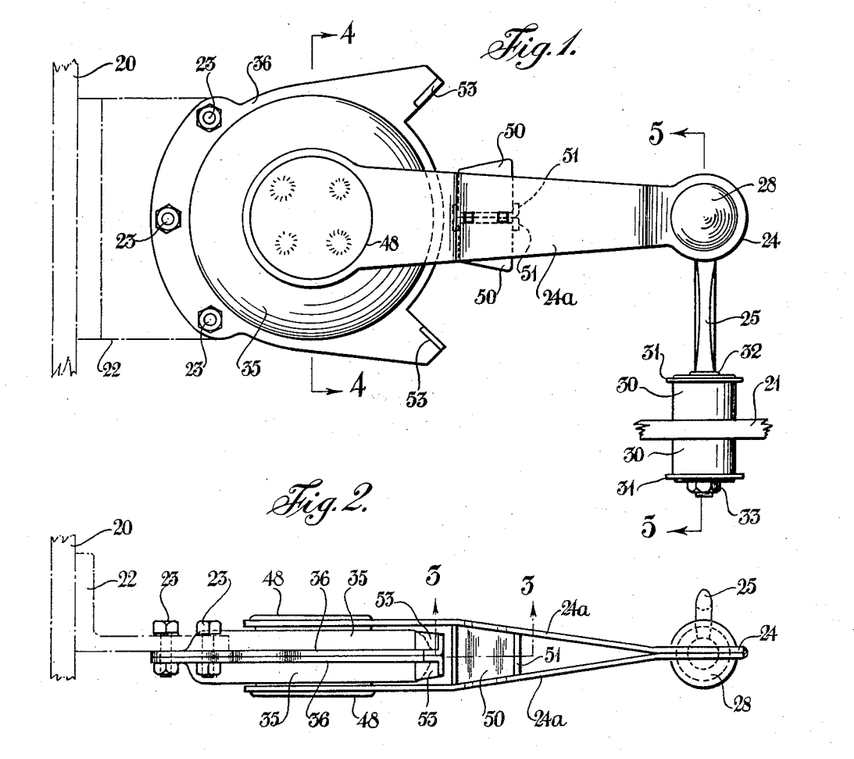
Figure 1 is a side elevation of a shock absorber constituting one embodiment of the invention.
Figure 2 is a plan view thereof.
Figure 3:
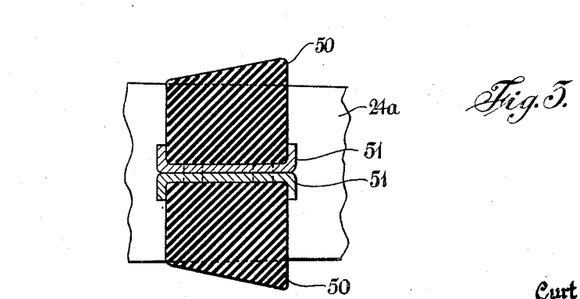
Figure 3 is a section on the line 3—3 of Figure 2.

The structure comprising the discs 40 with friction-faced rubber layers 44 thereon is movable angularly, relatively of the side plates 35 about the axis of the shock absorber, and to this end the said discs 40 are fixedly connected to the lever arm 24. As is best shown in Figure 2, the latter is a forked or divided structure comprising longitudinally extending portions 24a, 24a that are spread apart so as to straddle the shock absorber proper, the rear ends or hub portions of said fork portions 24a being permanently secured to the outwardly presented faces of the dished portions of discs 40, preferably by being spot welded thereto. Said hub portions of the lever arm forks 24a are formed with respective concavo-convex beads 48 that are concentric with the axis of the shock absorber, the concave faces of said beads confronting the edges of the flanges 38 of the side plates 35. Confined between the edges of flanges 38 and the concave faces of beads 48 are respective rubber gaskets 49, the function of which is to prevent dirt and grit from entering the shock absorber where it might impair the operation thereof. The arrangement is such that the beads 48 and/or flanges 38 may move relatively of the gaskets 49 during operation of the shock absorber.

The improved shock absorber operates by friction to absorb shocks incidental to all normal driving, which shocks may effect relative angular movement of the cooperating elements of the shock absorber to the extent of 60 degrees. Greater shocks, which would move the elements relatively through a greater angle, are more strongly opposed and to this end bumper means is provided. Said bumper means comprises a pair of rubber blocks 50, 50 that are bonded to respective metal plates 51, the latter being in abutting relation and mounted upon the lever arm 24, between the fork-portions 24a thereof. The flanges 38 of the side plates 35 are extended radially on the same side of the shock absorber as the lever arm 24, above and below the latter, and are formed with laterally extending ears 53, 53. The ears are disposed in the path of movement of the rubber blocks 50, and constitute abutments against which the latter impinge when relative movement between the frame 20 and running gear 21 is excessive. The ears 53 are disposed radially of the axis of the shock absorber, as are the faces of the blocks 50 that confront said ears, whereby said blocks and ears will be flush against each other whenever they come into engagement. Thus excessive shocks such as would turn the relatively movable elements of the shock absorber through a greater angle than about 60 degrees first are frictionally opposed by the movement of the friction material 45 over the inner surfaces of the plates 35, and then are strongly opposed by the engagement of a rubber bumper 50 with a pair of abutment ears 53.

The improved shock absorber is self lubricating, it provides uniform friction for opposing all shocks incidental to normal driving, and it achieves the other advantages set forth in the foregoing statement of objects. The expansion of the rubber ring 42 takes up any wear upon the friction material 45 so that good contact always is maintained between the latter and the cooperating faces of the side plates 35.

Figure 6:
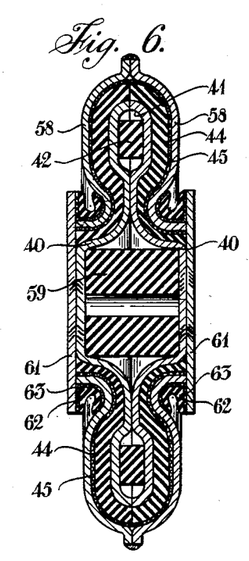
Figure 6 to Figure 17 inclusive are sections similar to Figure 4 showing other embodiments of the invention.

In the modified embodiment of the invention shown in Figure 6 of the drawings, the shock absorber proper comprises a pair of peripherally united side plates 58, 58 that are substantially identical to the side plates 35 of the previously described embodiment, a pair of circular discs 40, 40 that are identical with the discs previously described, and a ring of rubber 42 mounted in the recess 41 located between the confronting faces of the discs 40. Vulcanized to the outer lateral face of each disc 40 is an annular layer of resilient rubber composition 44, which layer extends from the perimeter of the disc to the outermost portion of the central dished portion thereof, but, not onto the latter, said rubber layer having a facing of lubricated friction material 45 vulcanized thereto. The friction facing of the discs 40 is urged against the confronting faces of the lateral plates 58 in the same manner as in the previously described embodiment, and supplementing the expansive force of the ring 42 as a means for urging the discs 40 apart from each other is a tubular block of rubber 59 that is positioned between the dished portions of the plates 40, at the axis of the shock absorber.

The structure comprising the discs 40 with friction-faced rubber layers 44 thereon is movable angularly relatively of the side plates 58 about the axis of the shock absorber, and to this end a lever arm such as the lever arm 24 previously described is provided. Said lever arm at one end is bifurcated or forked, the fork-portions 61, 61 of which straddle the shock absorber proper and have their hub portions permanently secured to the outwardly presented faces of the axial dished portions of the discs 40. The hub portions of the lever-forks 41 are of such diameter as to extend radially beyond the inner circumferential margins of the side plates 58 and over immediately adjacent regions of the latter, and positioned between the lever-arm hubs and the side plates 58 are respective annular elastic rubber gaskets 62 that serve to exclude dirt from the interior of the shock absorber. The gaskets 62 preferably are arcuate in transverse section as shown, and may have their convex faces covered with lubricated friction material 63. This embodiment of the invention functions in the same manner as the embodiment previously described and possesses all the advantages of the same.

Figure 7:
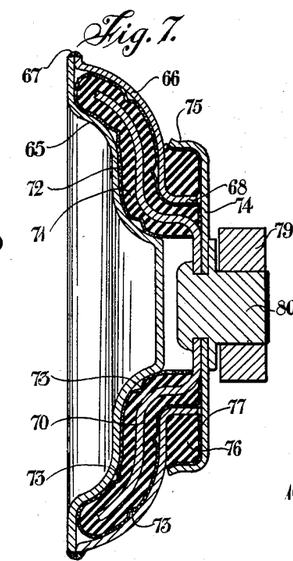

In the embodiment of the invention shown in Figure 7, the relatively movable part that is attached to the vehicle frame comprises a pair of side plates 65, 66 that are circular in plan and are united with each other at their perimeters, as by the welding 67. The plates 65, 66 are cup-shaped and are disposed in nested relation, but are axially spaced from each other to receive the other relatively movable part of the device, which device is connected to the running gear of the vehicle. The side plate 65 is disposed on the concave side of the fabricated structure, and has an imperforate axial portion that is flat and disposed normal to the axis of the device. The plate 66 is disposed on the convex side of the fabricated structure, is annular, and has its inner circumferential region formed with a circumferential, axially directed flange 68.

The other relatively movable part of the device comprises a generally cup-shaped metal disc 70 that is disposed between the side plates 65, 66, concentrically thereof, said disc having a flat axial portion that is disposed parallel to the flat axial portion of the plate 65, and is in substantially the same plane as the margin of the flange 68 of plate 66. The perimeter and both lateral faces of the disc 70, except for the flat axial region thereof, have a layer of resilient rubber composition 71 vulcanized thereto, said rubber layer comprising a facing 72 of lubricated friction material that bears against the confronting faces of the side plates 65, 66 and produces the friction that resists relative angular movement of the relatively movable parts of the shock absorber. The surface of the friction-faced rubber layer 71 may be formed with one or more concentric recesses 73 to receive a supply of lubricant for the friction facings 72.

Secured to the flat axial portion of the disc 70, on the outwardly presented side thereof, is a metal disc 74 that is disposed concentrically thereof and is attached thereto by spot welding or the like. The disc 74 extends radially beyond the margin of the flange 68, and has its perimeter formed with a circumferential flange 75 that extends laterally toward the adjacent side of the side plate 66. Confined between the disc 74 and the side plate 66 is a ring of resilient rubber composition 76 that has a facing of lubricated friction material 77 vulcanized thereto, which facing engages the confronting faces of the disc 74 and its flange 75. Preferably the rubber ring is vulcanized to the side plate 66 so as to be capable of movement relatively of the disc 74 during operation of the device. Both the rubber ring 76 and rubber layer 71 are placed under compressive stress by the assembly of the several plates and discs, whereby determinate friction between the rubber structures and the metal is obtained.

The side plates 65, 66 may be attached to the frame of a vehicle in any desired manner, for example, in the manner previously described with relation to the embodiment shown in Figure 1. The discs 70, 74 are connected to the running gear of the vehicle through the agency of a lever arm connected to the latter, the hub portion of said lever arm being shown at 79, Figure 7. The said hub of the lever arm is non-rotatably secured to a spindle 80 and the latter is secured to the discs 70, 74 at the axis thereof. The arrangement is such that oscillation of the lever arm effects angular movement of the discs 70, 74 relatively of the plates 65, 66 which movement is frictionally resisted by the friction-faced rubber structures 71 and 76. The latter also serves to exclude dirt and grit from the interior of the device.

Figure 8:
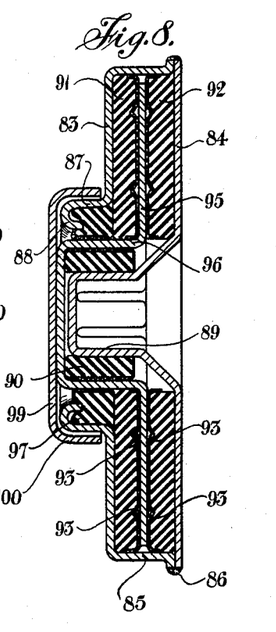

In the embodiment of the invention shown in Figure 8, the relatively movable part that is attached to the frame of the vehicle comprises a pair of side plates 83, 84 that are circular in plan, the plate 83 being annular and the plate 84 being imperforate. The peripheral portion of the plate 83 is formed with an axially extending circumferential flange 85 that has its margin permanently secured to the plate 84 as by being welded thereto at 86. The plates 83, 84 are disposed in laterally spaced apart relation to each other, and the plate 83 has its inner circumferential portion formed with an axially outwardly extending flange 87 the marginal portion of which is turned axially inwardly at 88 for a purpose presently to be explained. The medial region of the plate 84 is formed with an axial boss 89 that extends laterally through the opening defined by the flange 86 of plate 83, the end face of said boss being flat and disposed in a plane slightly beyond the plane of the inturned margin of the flange 86. Preferably the boss 89 is polygonal in transverse section, and has its peripheral surface covered with a friction-faced layer of resilient rubber composition 90 that is vulcanized thereto, the peripheral surface of the latter being truly cylindrical in shape. Also vulcanized to the confronting lateral faces of the plates 83, 84 are respective friction-faced layers of rubber composition 91, 92, the frictional faces of which confront each other and are formed with recesses 93, 93 for storing lubricant for the facing material.

The relatively movable portion of this embodiment of the invention that is connected to the running gear of the vehicle comprises an imperforate circular disc 95 that is formed with an axial boss 96 that is concentric with relation to the cylindrical rubber facing of the boss 89 of plate 84. The boss 96 fits tightly over said facing so that the latter frictionally engages the concave surface of the boss. The plane portion of the disc 95 is disposed between the friction facings of the rubber structures 91, 92 of the plates 83, 84, and tightly gripped by said rubber structures so that oscillating movement of the disc relatively of said structures frictionally is resisted. Confined between the flange 87 and the boss 96 is a resilient rubber ring 97 that has friction facing on the side that engages the boss 96. The ring 97 is urged against the inner peripheral region of the facing 91, and is retained in position at all times by the inturned margin 88 of the plate-flange 87. The primary purpose of the ring 97 is to exclude dust and dirt from the interior of the shock absorber.

For oscillating the disc 95, the outer lateral face of the boss 96 is permanently secured, as by spot welding, to the hub portion 99 of a lever arm that is connected to the running gear of a vehicle, in the same manner as in the previously described embodiments of the invention, said hub portion being formed with a laterally extending marginal flange 100 that circumscribes the plate-flange 87 and additionally provides for the exclusion of dirt and grit.

Figure 9:
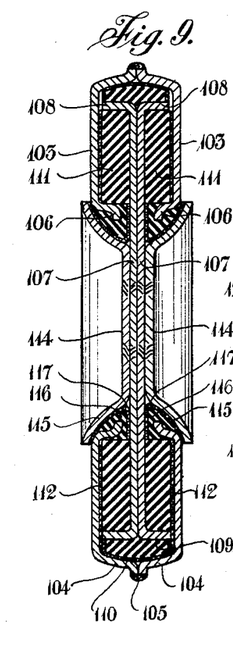

In the embodiment of the invention shown in Figure 9, the relatively movable structure that is attached to the frame of the vehicle comprises a pair of annular, concentric, side plates 103, 103 that are of identical size and shape. Said plates 103 are spaced apart from each other except at their perimeters where circumferential flanges 104 on the plates extend toward each other and are permanently united as by the weld 105. At its inner circumference each plate 103 is formed with an inturned, reversely curved flange 106, which flanges are laterally spaced apart from each other. The plates 103 are attached to the frame of the vehicle in any desired manner.

The relatively movable portion of the shock absorber that is connected to the running gear of a vehicle comprises a pair of imperforate metal discs 107, 107 that are mounted between the plates 103 and concentrically of the latter, said plates being permanently united with each other in face to face relation, preferably by spot welding. At their perimeters the plates 107 are formed with respective marginal flanges 108, which flanges are directed laterally away from each other. Vulcanized to the peripheral surface of the flanges 108 is a circumferential body of resilient rubber composition 109 having a facing of lubricated friction material 110, the latter being yieldingly urged by the rubber 109 into frictional engagement with the confronting surfaces of the flanges 104 of plates 103. The lateral faces of the discs 107, between the flanges 108 thereon and the flanges 106 of plates 103, have respective concentric annular bodies of resilient rubber 111 vulcanized thereto, which bodies have lubricated friction facings 112 thereon, the latter being frictionally engaged with the confronting surfaces of the side plates 103.

For oscillating the discs 107, a lever arm is connected to the running gear of a vehicle in the manner previously described, said lever arm having a forked hub portion comprising members 114, 114 that straddle the shock absorber proper and are permanently secured to the discs 107 as by spot welding. The hub portions 114 are formed with respective annular, transversely arcuate flanges 115 that are concentric with the axis of the shock absorber and overlie the respective flanges 106 of the side plates 103. The flanges 106 have respective annular rubber gaskets 116 bonded thereto and covering the margins thereof, said gaskets being provided with facings of lubricated friction material 117 that frictionally engage the adjacent surfaces of the discs 107 and the lever-flanges 115, thereby excluding grit and dirt from the operative elements of the shock absorber.

Figure 10:
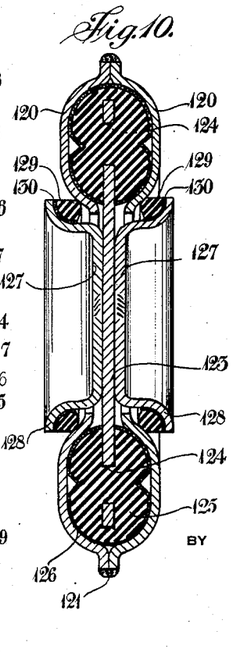

In the embodiment of the invention shown in Figure 10, the relatively movable structure that is attached to the frame of the vehicle comprises a pair of annular, concentric side plates 120, 120, each of which is arcuate or dished in transverse section, the said plates being secured to each other at their perimeters, as by the welding 121, with their concave faces confronting each other to provide an internal chamber. The fabricated structure is of torous shape, its internal chamber being open to the axial opening of the structure by reason of the inner circumferential margins of the plates 120 standing somewhat apart from each other.

The relatively movable portion of the structure that is connected to the running gear of the vehicle comprises a circular metal disc 123 that is disposed between the plates 120 and formed with a plurality of apertures 124 adjacent its perimeter. Vulcanized to the peripheral region of the disc 123 is a body of resilient rubber composition 125 having a facing of lubricated friction material 126 thereon, said rubber body being disposed upon both lateral faces and over the peripheral margin of the disc, the friction facing on the rubber body being yieldingly urged by the latter into engagement with the confronting surfaces of the plates 120. The disc 123 is oscillated by means of a lever arm having a forked hub comprising hub-portions 127, 127 that straddle the shock absorber proper and are permanently secured to the axial region of the disc 123, on opposite sides thereof, by being welded thereto. The hub portions 127 of the lever-arm are formed with respective annular, transversely arcuate, flanges 128 that are concentric with the axis of the shock absorber and overlie the respective inner circumferential margins of the plates 120. Confined between the flanges 128 and the adjacent faces of the plates 120 are respective annular rubber gaskets 129 that exclude dirt and grit from the interior of the shock absorber. The gaskets may have a friction facing 130 on the sides thereof that are in contact with the flanges 128, substantially as shown.

Figures 11, 12:
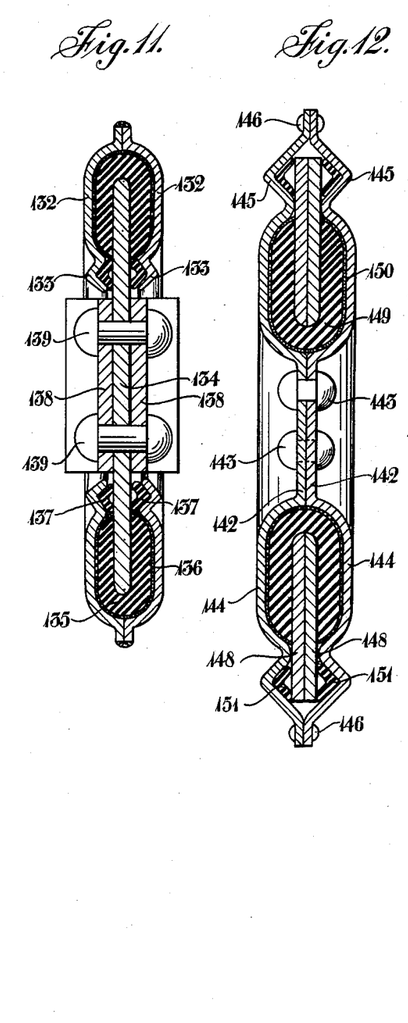

In the embodiment of the invention shown in Figure 11, the relatively movable structure that is attached to the frame of the vehicle comprises a pair of side plates 132, 132 that are essentially similar to the side plates 120 of the embodiment shown in Figure 10, said plates differing from the latter in the shape of their inner circumferential regions, which regions are formed with respective circumferential ribs 133 that are angular in transverse section and present their concave surfaces toward each other. The relatively movable portion of the structure that is connected to the running gear of the vehicle comprises a metal disc 134 that is disposed between the plates 132, in spaced relation thereto. A body of resilient rubber 135 is vulcanized to the perimeter and opposite lateral faces of the disc 134 in the region thereof that lies between the plates 132, radially outwardly of the ribs 133, said rubber body having a lubricated friction facing 136 vulcanized thereto, said facing frictionally engaging the confronting faces of the plates 132. Annular rubber gaskets 137, 137 that are angular in section are mounted within the concavities of the respective ribs 133, said gaskets also engaging the respective faces of the disc 134 to exclude dirt and grit from the shock absorber. The disc 134 is oscillated by means of a lever arm having a forked hub comprising hub portions 138, 138 that straddle the shock absorber proper and are secured to the disc 134, on opposite sides of the axial region thereof, in any suitable or desired manner, such as by means of the rivets 139 shown.

In the embodiment of the invention shown in Figure 12, the relatively movable structure that is connected to the running gear of the vehicle comprises a pair of imperforate side plates 142, 142 that are secured together at their medial regions by rivets 143, 143 or the like. Radially outwardly of said medial regions, and concentrically of the axis of the structure, the plates 142 are annularly dished at 144, the concave faces of said dished regions confronting each other. Circumscribing said dished regions 144 are respective annular ribs 145, 145, the concave sides of the latter confronting each other. At diametrically opposed local regions of the plates 142, the marginal portions thereof are in abutting relation and are secured to each other by rivets 146, as shown in the drawings. Formed integrally with the plates 142 are radially projecting lever arms (not shown) that are connected to each other and to the running gear of the vehicle.

The relatively movable portion of the shock absorber that is attached to the frame of the vehicle comprises a pair of annular metal discs 148, 148 disposed in face to face relation between the dished portions 144 and rib portions 145 of the side plates 142. The inner circumferential margin and adjacent lateral surfaces of the discs 148 have a layer of resilient rubber composition 149 vulcanized thereto, which rubber layer has a facing of lubricated friction material 150 bonded thereto. The arrangement is such that the rubber layer yieldingly urges the friction material into frictional engagement with the concave surfaces of the dished regions 144 of the side plates 142. Annular rubber gaskets 151 of angular cross section are mounted in the respective concavities formed in the plates 142 by the ribs 145, said gaskets engaging opposite faces of the abutted discs 148 to exclude dirt and grit from the interior of the shock absorber. At one region of the structure the discs 148 are formed with respective radial extensions (not shown) that project from between the margins of the plates 142 and are secured to the frame of a vehicle in any preferred or desired manner.

Figure 4:
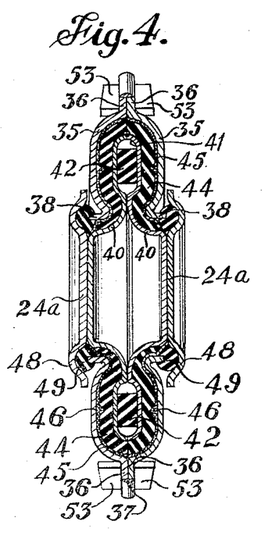
Figure 4 is a section on the line 4—4 of Figure 1.
Figure 5:
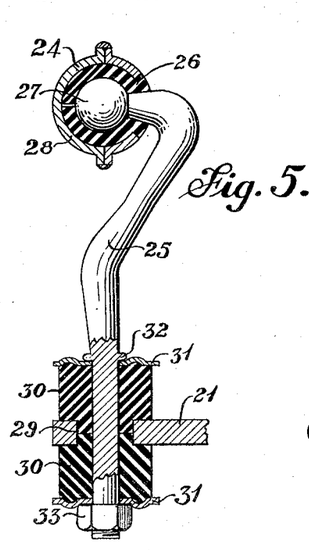
Figure 5 is a section on the line 5—5 of Figure 1.
Figure 13:
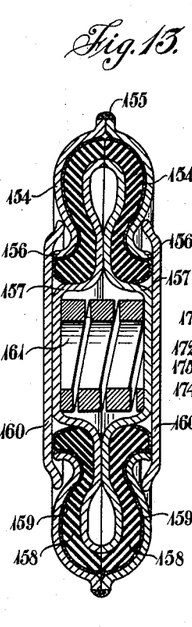

The embodiment of the invention shown in Figure 13 is essentially similar to the shock absorbers shown in Figure 4 and Figure 6. Thus the relatively movable structure that is connected to the frame of the vehicle comprises a pair of annular concentric side plates 154, 154 that are dished in transverse section and have their concave sides in confronting relation, the peripheral margins of the plates being united by welding 155, the inner circumferential regions of the plates being somewhat spaced apart and the inner marginal portions being outwardly bent into axially extending flanges 156, 156. The relatively movable structure that is connected to the running gear of the vehicle comprises a pair of imperforate discs 157, 157 having oppositely dished peripheral regions disposed between the dished regions of the plates 154, and oppositely dished medial regions disposed radially inwardly of the flanges 156 of the plates 154, the outer lateral faces of the medial dished regions of the discs being in the same plane as the margins of the respective flanges 156. Vulcanized to the outwardly presented faces of the discs 157, radially outwardly of the medial dished portions thereof, are respective bodies of resilient rubber composition 158, 158, said bodies being faced with lubricated friction material 159 that is in contact with the concave surfaces of the dished portions of the plates 154 and the convex surfaces of the flanges 156 thereof. As in the previously described embodiments of the invention, the discs 157 concurrently are oscillated by a lever arm connected to the running gear of the vehicle, said lever arm having a forked hub portion comprising members 160, 160 that straddle the shock absorber proper and are secured to the medial dished portions of the discs 154, as by spot welding. The said hub portions 160 are of such size as to extend radially beyond the margins of the flanges 156, the marginal portions of the said hub members being bent into engagement with the outer lateral faces of the respective plates 154. The arrangement is such as to exclude dirt and grit from the working surfaces of the shock absorber. A helical compression spring 161 is disposed between the discs 157 in engagement with the medial dished portions thereof for urging said discs apart and thus urging the friction facings 159 of the rubber bodies 158 into good frictional contact with the confronting surfaces of the side plates 154.

Figure 14:
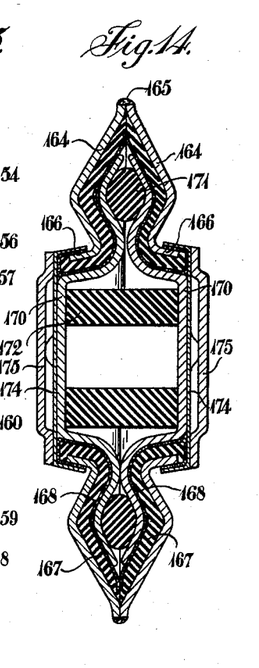

In the embodiment of the invention shown in Figure 14, the relatively movable structure that is connected to the frame of the vehicle comprises a pair of co-axial, annular side plates 164, 164 disposed side by side and united with each other at their perimeters by means of welding 165. The plates 164 are transversely dished, which dished portions are somewhat angular in section with the concave sides of plates in confronting, spaced relation, the inner circumferential regions of the plates being spaced apart, and curved outwardly to provide axially extending flanges 166. Vulcanized to the confronting faces of the plates 164 are respective bodies of resilient rubber composition 167 that extend onto the flanges 166 and cover the margins thereof, and each of said rubber bodies has a facing 168 of lubricated friction material, which material extends about the margins of the flanges 166 and terminates on the outer faces of the flanges.

The relatively movable structure that is connected to the running gear of the vehicle comprises a pair of imperforate circular discs 170, 170 that are disposed between the plates 164, the peripheral regions of said discs being dished in the same manner as the plates 164, the medial region of the discs, inwardly of the flanges 166 of said plates, also being dished, the concave faces of said discs 170 confronting each other. The outer lateral surfaces of the discs 170, with the exception of the medial regions thereof, are in contact with the friction facings 168 of the rubber bodies 167. The discs 170 are urged apart from each other so as to provide improved frictional contact with the facings 168, and to this end an annular ring of rubber 171 is mounted between the annular peripheral concavities of the said discs, and a tubular block of rubber 172 is mounted between the axial concavities of the discs, both of said members 171, 172 normally being under compressive stress.

For effecting oscillation of the discs 170 relatively of the plates 164 and rubber bodies 167 on the latter, relatively thin metal discs 174, 174 are permanently secured to the outer lateral faces of the medial dished portions of said discs 170, as by being spot welded thereto. Each disc 174 is formed with a peripheral flange that closely circumscribes the flange 166 of a plate 164, and frictionally engages the friction material 168 thereon. As in the previously described embodiments of the invention, a lever arm is connected to the running gear of the vehicle said lever arm having a forked or divided hub portion comprising members 175, 175 that straddle the shock absorber proper and are removably connected to the discs 174, as by means of set screws (not shown).

Figure 15:
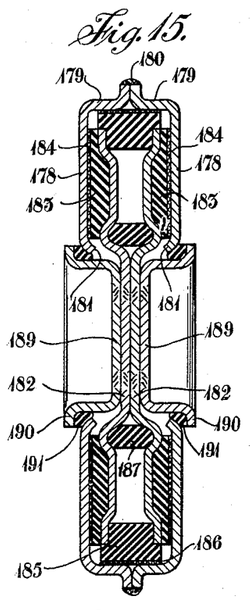

In the embodiment of the invention shown in Figure 15, the structure that is attached to the frame of the vehicle comprises a pair of annular, coaxial, spaced apart plates 178, 178 that are formed with respective peripheral flanges 179 that extend toward each other and are united at their margins by welding 180. The remaining portions of the plates are disposed in parallel planes except the inner circumferential marginal portions 181, 181, which are turned inwardly toward each other. The relatively movable structure that is connected to the running gear of the vehicle comprises a pair of imperforate metal discs 182, 182, which discs are co-axially disposed with relation to the plates 178 and are positioned between the latter. The discs 182 are in laterally abutting relation in their medial region, that is, radially inwardly of the marginal portions 181 of the plates 178, but radially outwardly of the region the disc structures are offset, said offset portions of the discs being disposed in spaced apart relation, and in spaced relation to the confronting faces of the plates 178. The outer lateral faces of the offset portions of the discs 182 have respective bodies of resilient rubber composition 183 vulcanized thereto, said rubber bodies having facings of lubricated friction material 184, which facings frictionally engage the confronting lateral faces of the plates 178. The perimeter of the discs 182 are disposed radially inwardly of the flanges 179 of plates 178, and mounted upon the peripheral margins of the discs is a ring of resilient rubber composition 185 having its perimeter faced with lubricated friction material 186, which material frictionally engages the confronting surfaces of the said flanges 179. A portion of the ring 185 extends somewhat radially inwardly between the discs 182, and in the assembled condition of the device is under compressive stress so as to urge the discs apart from each other and thereby to urge the friction facings of rubber bodies 183 against the confronting lateral faces of the plates 178. Supplementing the rubber ring 185 as a means for urging the discs 182 apart is a second rubber ring 187 that is of smaller diameter than the ring 185 and is positioned between the discs at the bottom of their offset regions.

For oscillating the discs 182 relatively of the side plates 178 the usual lever arm is provided, which lever arm has a forked hub portion comprising members 188, 188 that straddle the shock absorber proper and are secured to the outwardly presented faces of the discs 182, in the axial region of the latter, as by spot welding. The portions 188 are dished as shown, and are formed with outwardly directed marginal flanges 190 that are concentric with the axis of the device and which overlie the respective flanges 181 on the inner circumferential margins of the plates 178. Annular rubber gaskets 191, 191 are mounted between the said flanges 190, 181 which gaskets normally are under compressive stress and serve to keep dirt and grit from the interior of the shock absorber.

Figure 16:
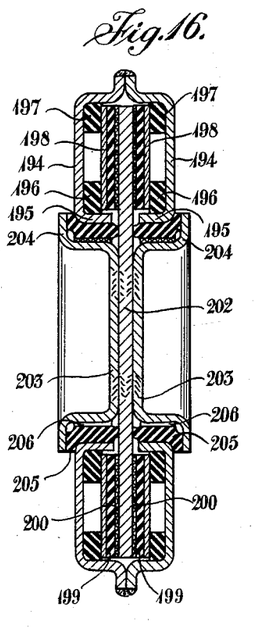

In the embodiment of the invention shown in Figure 16, the portion of the structure that is attached to the frame of the vehicle comprises a pair of annular side plates 194, 194 that are essentially similar to the side plates 178 of Figure 15 except that the flanges 195 at their inner circumferential margins extend closer to the central plane of the device. Vulcanized to the confronting faces of the plates 194, at the juncture of the latter with respective flanges 195, are respective circumferential bodies of resilient rubber composition 196. Similar circumferential bodies 197 of resilient rubber are vulcanized to the confronting faces of the plates 194 at the juncture thereof with the peripheral flanges of the plates. Each pair of rubber bodies 196, 197 supports an annular metal plate 198 that is disposed parallel to the plates 194 and between the same, the confronting faces of the plates 198 being covered with a layer of resilient rubber composition 199 that has a facing of lubricated friction material 200 bonded thereto.

That portion of the device that is connected to the running gear of the vehicle comprises an imperforate metal disc 202 that is centrally disposed between the plates 194, co-axially thereof. The arrangement is such that the friction facings 200 engage opposite faces of the disc 202, the rubber bodies 196, 197 being under appreciable compressive stress in the operative device so as to urge said facings 200 into strong frictional engagement with the faces of the disc. For oscillating the disc 202 relatively of the side plates 194, the usual lever arm is provided, which lever arm is connected at one end to the running gear of the vehicle in the manner hereinbefore described. At its other end the lever arm is formed with a forked hub portion comprising portions 203, 203 that straddle the shock absorber proper and are secured to opposite lateral faces of the disc 202, in the medial region thereof, as by being spot welded thereto. The hub portions are dished, as shown, and are formed with respective outwardly directed marginal flanges 204 that extend radially slightly beyond the flanges 195 of the plates 194, and laterally thereof. The flanges 204 and adjacent dished portions of the hubs 203 engage rubber bodies 205 vulcanized to the plate-flanges 195, which rubber bodies have facings of lubricated frictional material 206 in frictional contact with the confronting circumferential portions of the hub structures 203. The arrangement is such as to exclude dirt and grit from the interior of the shock absorber.

Figure 17:
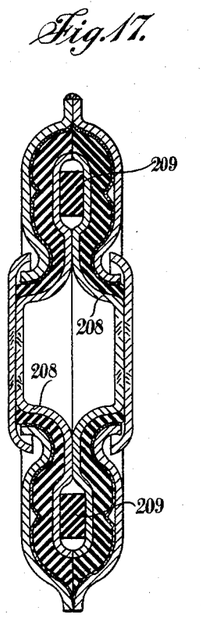

The embodiment of the invention shown in Figure 17 in most respects is similar to the embodiment shown in Figure 13 and hereinbefore described. The device includes discs 208, 208 that are connected to the running gear of a vehicle in the same manner as in the devices previously described, which discs are similar in shape and function to the discs 187 of the previously described device, said discs normally being urged apart from each other by a co-axially disposed ring of rubber 209 that is interposed between the discs in the region thereof where the latter have their outwardly directed faces covered with friction-faced rubber structures. The spring 161 shown in Figure 13 is omitted from the device shown in Figure 17.

All of the shock absorber constructions described function by reason of relative angular movement between two frictionally engaged surfaces, and all achieve the several advantages set forth in the foregoing statement of objects. It will be understood that the rubber cushions 50 and abutments 53 shown in Figures 1 to 3 of the drawings may be provided in all of the embodiments shown, whereby extreme relative movement of the frictionally engaged members is opposed by the resistance of a rubber body 50 to deforming stress.

Other modifications may be resorted to without departing from the spirit of the invention or the scope thereof as defined by the appended claims.

What is claimed is:

1. In a shock absorber of the character described, the combination of a pair of spaced-apart, co-axial plates permanently secured to each other at a circumferential margin thereof to produce a unitary structure, a disc-like structure having a portion disposed between said plates co-axially thereof, means for effecting relative oscillatory movement of said plates and the intermediate disc-like structure, a body of normally compressed resilient rubber composition vulcanized to one of said relatively movable structures, and a facing of permanently lubricated friction material bonded to said rubber body and urged thereby into frictional engagement with the confronting face of the other relatively movable structure.

2. A shock absorber of the class described comprising an annular housing having an annular cavity therein and being adapted to be fixed to the chassis of an automobile, an oscillating hub member mounted concentrically in said housing, said hub member being formed of a pair of circular plates said plates being formed with a dished central portion and having peripheral flanges, the radial outer portion of said flanges being formed into annular grooves concentric with the axis of said plates, a substantial thickness of rubber vulcanized to the back of said plates and extending from the area of the edge of the dished portion of said plates to the peripheral edges thereof, said rubber having an outer surface layer of friction fabric permanently attached thereto, said grooves and dished portions being on the same side of said plates, said plates being adapted to be assembled in face-to-face relation whereby said hub is formed and said grooves cooperate to form an annular cavity in the peripheral portion of said hub, a ring formed of rubber mounted in said cavity and extending the length thereof, said ring being of greater normal axial thickness than the axial depth of said cavity whereby the said ring exerts a force urging said plates apart, said rubber and fabric on the back of said plates having an annular groove formed therein, flanges of said plates in assembled relation being extended into said housing with said fabric being urged against the inner surface of the walls of said housing thereby compressing said ring, a lubricating material disposed in and thoroughly saturating said fabric, whereby a lubricated frictional contact is made with said housing walls and a reserve of said lubricating medium is accumulated in said groove.

3. A shock absorber of the character described comprising an annular housing having an annular cavity therein and being adapted to be fixed to the chassis of an automobile, an oscillating hub member mounted concentrically in said housing, said hub member being formed of a pair of circular plates, said plates being formed with a dished central portion and having peripheral flanges, the radial outer portion of said flanges being formed into annular grooves concentric with the axis of said plates, a substantial thickness of rubber vulcanized to the back of said plates and extending from the area of the edge of the dished portion of said plates to the peripheral edges thereof, said rubber having an outer surface layer of friction fabric permanently attached thereto, said grooves and dished portions being on the same side of said plates, said plates being adapted to be assembled in face-to-face relation whereby said hub is formed and said grooves cooperate to form an annular cavity in the peripheral portion of said hub, an annular groove formed in said fabric surface, said flanges in assembled relation being extended into said housing with said fabric being urged against the inner surface of the walls of said housing by the resiliency of said rubber, a lubricating material disposed in and thoroughly saturating said fabric, whereby a lubricated frictional contact is made with said housing walls and a reserve of said lubricating medium is accumulated in said groove.

CURT SAURER.